Patented July 9, 1935

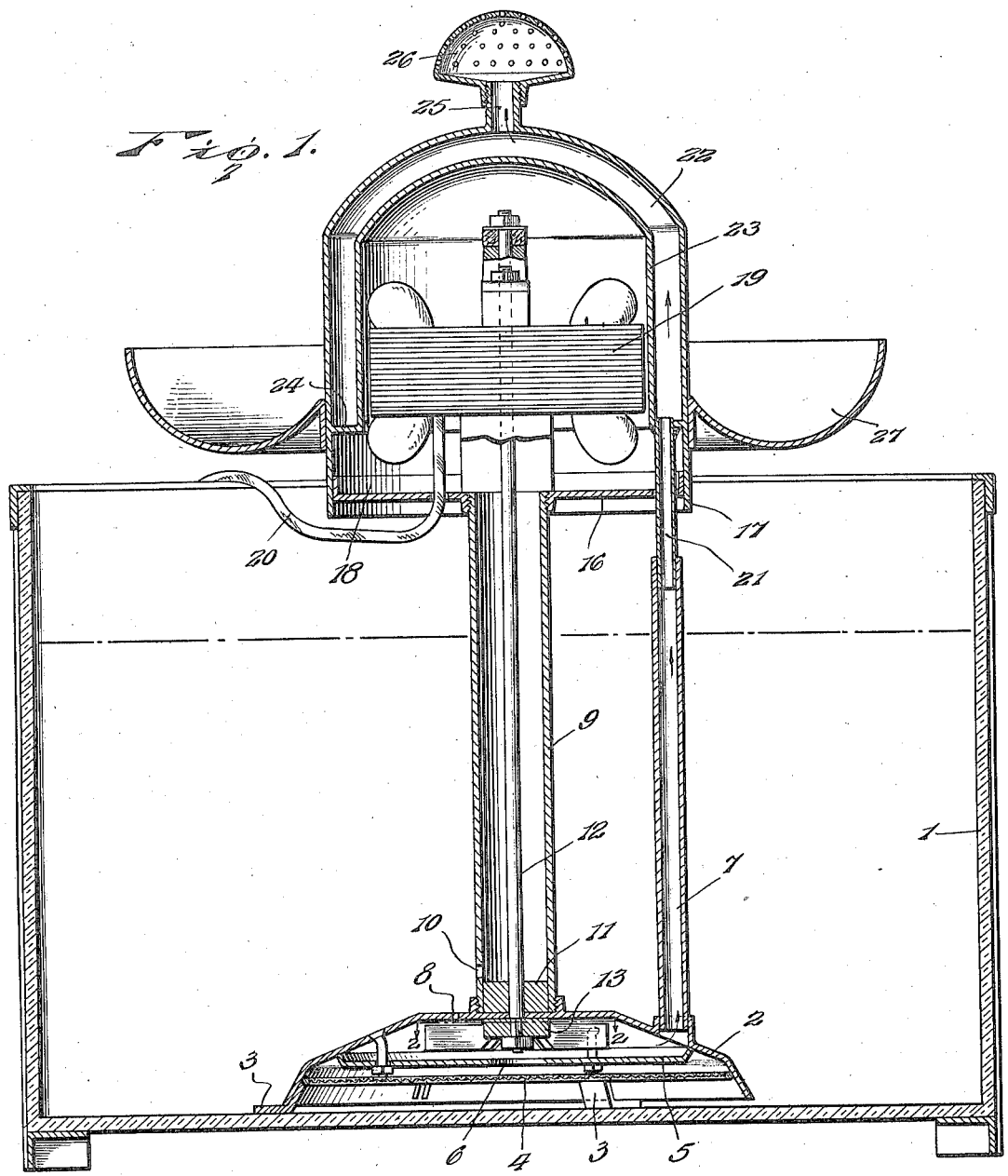

2,007,856

UNITED STATES PATENT OFFICE 2,007,856

FOUNTAIN

James Fred Haldeman and Marshal E. Davis, Bloomfield, Ind.

Application March 16, 1934, Serial No. 715,947

3 Claims. (Cl. 299—7)

This invention has for its object the provision of a fountain especially adapted for use in aquariums and similar places whereby a constant flow and discharge of water may be effected in an economical manner. The invention seeks to provide such a device which will be efficient and durable and of simple construction and arrangement of parts whereby it is not apt to get out of order. A device embodying the invention is illustrated in the accompanying drawing and will be hereinafter fully described, the novel features being particularly defined in the claims following the description.

In the drawing:

Figure 1 is a vertical section of a fountain embodying the present invention,

Figure 2 is a detail section on the line 2—2 of Figure 1.

In the drawing, the reference number 1 indicates an aquarium which may be of any preferred dimensions and form and is illustrated in a conventional manner only, it being understood that the aquarium will contain small fish and may also hold the imitation scenery in the well-known manner. The fountain constructed according to this invention comprises a base 2 which is equipped with feet 3 whereby it will be supported upon the bottom of the aquarium or may be mounted in an outdoor rock garden. The base is hollow, and a screen 4 is removably fitted within the base and rests upon the upper ends of the feet 3, as clearly shown, the feet also serving to maintain the lower edge of the base in spaced relation to the bottom of the aquarium whereby the water in the aquarium may circulate under the base and rise through the same to be discharged, as will presently appear. A horizontal partition or inner bottom 5 is also secured within the base 2 and is provided with a central opening 6 through which the water may pass to rise through a pipe 7 which is secured at its lower end in the base within the area defined by the bottom 5 to carry the water to the discharge cap. A small opening 8 is provided in the top of the base 2 so that water may pass into the base through the top of the same, and rising centrally from the base is a hollow pillar or standard 9 which supports the upper portion of the fountain, an opening 10 being provided in this pillar or standard adjacent the lower end of the same so that water may enter the standard and form a seal to prevent leakage around the pump shaft. In the lower end of the pillar or standard 9 is a bushing or packing 11 below the opening 10 and a pump shaft 12 passes centrally through this bushing and has an impeller 13 secured on its lower end within the base. The impeller, as shown most clearly in Figure 2, comprises a central disk or body 14 secured upon the lower end of the shaft 12 and blades 15 which extend radially from the central body or disk and are preferably curved so as to more effectually force the water from the base into and through the pipe 7. An upper housing or cap is fitted about a disk 16 which is secured upon the upper end of the hollow standard 9, the cap comprising an outer preferably cylindrical body 17 having its lower end fitted closely about an annular flange 18 on the disk. The pump shaft 12 extends centrally into the interior of the cap or housing 17 and carries an electric motor 19 within said housing, the motor being fed with actuating current through a cord 20 which may be plugged into the house wiring. The motor is thoroughly covered with wax or similar material so that should there be any leakage of water into the motor chamber, the water cannot reach the working parts and form short circuits which would prevent the proper operation of the device and also tend to burn out the motor.

The upper end of the pipe 7 is fitted to a nozzle 21 which extends through the disk or bottom plate 16 and leads into an auxiliary chamber 22 which is defined by an inner wall 23 conforming to the cap or housing 17, as shown, the lower edge portion of the inner wall being turned laterally, as shown at 24, and welded, brazed or otherwise intimately connected with the side wall of the housing. The housing or outer wall of the cap is provided at its center on its top with a nipple 25 upon which is secured a perforated cap 26 through which the water is discharged in fine streams which diverge in various directions.

In order to increase the attractiveness of the device, a pan 27 may be secured around the cap or housing 17 to catch some of the water from the spraying cap and small boats or artificial aquatic animals may be placed in the water in said pan.

The operation of the device will, it is thought be readily understood from the foregoing description, taken in connection with the accompanying drawing. When the device is in place, and the cord 20 properly connected with a source of electric current, the motor will, of course, be set in motion and the pump shaft 12 which carries the motor will be caused to rotate in its bearings, the impeller on the lower end of the shaft rotating therewith and acting upon the water to set up a circulation of the same, drawing the water through the opening 8 and under the edge of the base 2 and driving it out through the pipe 7 with considerable force. The water rises through the pipe 7 and enters the auxiliary chamber 22 from which it will pass through the nipple 25 into the discharging cap 26 whence it will issue in various directions, as previously stated and as will be understood. It will be readily noted that while the water is caused to rise past the motor, the motor is thoroughly protected from the water so that short circuits are not apt to occur. The device is composed of few parts which are compactly arranged and it is, therefore, not apt to get out of order but will prove very durable and operate efficiently whenever the current is supplied. The device is intended primarily for use in indoor aquariums but it may be used in outdoor aquariums or rock gardens or other places wherever a fountain is desired. While there is clearance between the motor and the inner wall 23 of the water chamber, the parts are very close together. The motor and the water chamber, consequently, react upon each other so that the motor is kept cool and the water is kept at an even temperature beneficial to the fish and plant life.

Having thus described the invention, we claim:

1. A fountain comprising a hollow base, a water chamber above the base provided with a perforated discharging cap, a pipe connecting the base with the water chamber, a pump disposed within the hollow base, and a motor housed by the water chamber and connected with the pump, the water chamber constituting a water jacket for the motor.

2. A fountain comprising a hollow base, a hollow standard rising from the base, a disk secured on the upper end of the standard, a housing secured about said disk and rising therefrom, an inner wall secured within and conforming to the housing to form a water chamber, pipes connecting the hollow base with the water chamber, a motor mounted within the housing in proximity to the water chamber and having its shaft extending downwardly through the hollow standard, and an impeller secured on the lower end of the shaft within the hollow base.

3. A fountain comprising a hollow base, feet adapted to support the base within a body of water with an open space below the lower edge of the base, a screen detachably fitted in the base and resting on the feet, a horizontal partition above the screen within the base having an opening therethrough, a pipe rising from the base above and within the area of said partition, a water chamber communicating with the upper end of said pipe, a housing containing said water chamber, means for supporting the housing from the base, a motor within said housing, the water chamber constituting a water jacket for the motor and a pump above the partition within the hollow base and connected with the motor.

JAMES FRED HALDEMAN. [L. S.]
MARSHAL E. DAVIS. [L. S.]